United States Patent [19]

Alvarez et al.

[11] 4,258,110
[45] Mar. 24, 1981

[54] ELECTROLYTIC DEVICE

[76] Inventors: Mario Y. Alvarez; Oscar Mejia, both of Avenida 39 No. 14-92, Bogota, Colombia

[21] Appl. No.: 657,293

[22] Filed: Feb. 11, 1976

Related U.S. Application Data

[63] Continuation-in-part of Ser. No. 446,900, Feb. 28, 1974, abandoned.

[30] Foreign Application Priority Data

Nov. 9, 1973 [CO] Colombia .............................. 142075

[51] Int. Cl.³ ............................................ H01M 6/06
[52] U.S. Cl. .................................... 429/188; 429/190
[58] Field of Search ............... 136/157, 158, 107, 154; 317/242; 429/188, 190, 218, 164, 166; 361/433

[56] References Cited

U.S. PATENT DOCUMENTS 215,899  5/1979  Ehrenberg .......................... 136/154
1,201,481 10/1916  McGall et al. ................ 136/157 X
3,019,141  1/1962  Priebe ............................. 136/157 X

FOREIGN PATENT DOCUMENTS 641427  8/1950  United Kingdom ..................... 136/157

Primary Examiner—Anthony Skapars
Attorney, Agent, or Firm—Browdy and Neimark

[57] ABSTRACT

A dry-cell battery construction includes, together with a conventional filler material containing a depolarizing agent in contact with its cathode, an electrolyte comprised of a raw paste material from vegetal origin contacting the zinc anode thereof. The electrolyte is preferably raw paste material of the fruit of the Carica papaya. The filler material may contain urine or raw paste of the fruit of the Carcia papaya or both. An electrolytic capacitor having two electrodes, one of which is provided with a layer of insulation, is provided with an electrolyte comprised essentially of raw paste material of fruit of the Carica papaya.

19 Claims, 4 Drawing Figures

ELECTROLYTIC DEVICE

CROSS REFERENCE TO RELATED APPLICATION

This application is a continuation-in-part of the copending application Ser. No. 446,900 of Mario Yankel Alvarez et al entitled "Dry Battery Contruction" filed Feb. 28, 1974, now abandoned the disclosure of which is incorporated herein in its entirely by reference.

FIELD OF THE INVENTION

This invention relates to an electrolyte which is comprised essentially of a raw paste of fruit of the *Carica papaya* and to electrolytic devices, including capacitors and batteries, having this electrolyte as a constituent.

BACKGROUND OF THE INVENTION

The dry-cell construction Leclanche devised by 1886 affords the basic principle on which the present time dry or primary batteries are constructed. According to Leclanche's construction, a carbon plate or rod was encircled by a mixture of powdered carbon and manganese dioxide, with an amount of 10–20 weight percent ammonium chloride solution. Manganese chloride was sometimes added. As the battery case, zinc sheet was used.

A 1.5 volt changing tension was obtained. From such value the tension slowly dropped off, with an actual average value being from 1.2 to 1.3. During its inactive condition, the original tension was nearly wholly regained, the battery being so particularly useful for intermittent action.

The general chemical reaction involved is now expressed as follows:

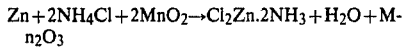

$$Zn + 2NH_4Cl + 2MnO_2 \rightarrow Cl_2Zn.2NH_3 + H_2O + Mn_2O_3$$

Dr. Carl Gassner in 1888 improved the Leclanche cell, originating the first dry-cell battery. The improved battery was comprised of a zinc case, acting as both the battery anode and its container. A gel-like electrolyte was put up within such container and a carbon rod, encircled by depolarizing mixture, was located at the center thereof. This is the basic construction followed at the present for manufacturing commercial dry batteries, of any model, which are currently used to generate low-voltage electric power.

Broadly, the electrolyte heretofore used for dry batteries has consisted of a gel-like body containing therein about 20 weight percent ammonium chloride and 9 weight percent zinc chloride, arranged between the battery anode and cathode. Such gelly paste usually comprises a mixture of the electrolyte substance and corn starch and wheat meal. Synthetic materials affording improved electrical properties and longer shelf life, such as methyl-cellulose, Cellosolve and the like, are also used.

It is well known that during the discharging process the battery electrolyte changes in composition. In the layer adjacent the zinc electrode the pH value changes from about 5.7 to about 3.8 (thus becoming more acidic) while in the innermost region the pH of the mixture changes from about 5.8 to 11 (more alkaline).

Dry batteries comprising the aforecited conventional electrolyte, generally show a steady slow rate characteristic of discharge, until reaching the 1-volt final tension, when discharging at 20° C. The electrical tension of the battery continuously decreases as it discharges. The rated capacity depends upon, therefore, the intended final tension. For comparison purposes, when testing commercial Size D batteries, at a 4 ohms load, the results set forth in the following Table I are obtained, for different final tensions.

TABLE I

| Final Voltage | Time hrs. | Ah | Watts-hr. | Wh/kg. |
|---|---|---|---|---|
| 1.4 | 0 | 0 | 0 | 0 |
| 1.2 | 0.25 | 0.244 | 0.317 | 0.31 |
| 1.0 | 2.35 | 0.681 | 0.792 | 8.27 |
| 0.9 | 3.50 | 0.955 | 1.04 | 10.87 |
| 0.8 | 5.50 | 0.37 | 1.37 | 14.33 |

Another kind of electrolyte uses 20 weight percent caustic soda, in which the zinc goes into reaction to form sodium zincate, the hydrogen released being absorbed at the carbon surface by the atmospheric oxygen occluded within the electrolyte, thus spending air at a rate above 1 liter in one hour. In order to decrease the hydroxyl ion consumption, calcium hydroxide, which is scarcely soluble, is added to the electrolyte, thereby forming soluble calcium zincate being so reclaimed the sodium hydroxide. The electrolyte in this latter kind of dry battery is held in place by adding thereto corn starch paste. Preferably, the miniature 5.5 ampere-hour dry batteries are so constructed.

Also, the electrolyte may be comprised of 35–40 weight percent potassium hydroxide saturated with sodium zincate, supported on α-cellulose.

The aforecited prior art batteries have a rather short life as contrasted to that one attainable in the batteries according to the present invention.

SUMMARY OF THE INVENTION

It is an object of the present invention to provide an electrolyte for capacitors, batteries and the like which can be easily and readily made.

It is another object of the present invention to provide an electrolytic capacitor of simple and yet reliable construction.

It is a further object of the present invention to provide an electrical battery having an extended life.

It is an additional object of the present invention to provide a dry battery having an extended life and a substantially continuous discharge characteristic.

It is yet another object of the present invention to provide an electrolyte for dry batteries, whereby the life thereof is substantially extended and their discharge characteristics are notably continuous.

Applicants have discovered that if, in a dry battery comprising an anode and a cathode separated from one another by means of a permeable web, such as newsprint, a raw paste material from vegetal origin, especially paste material of fruit of the *Carica papaya*, is used as the battery electrolyte according to this invention, surprisingly a longer lasting actual duration of discharge is attained, with such discharge occurring at a more steady rate, as contrasted to the whole performance of the prior art batteries.

In one of its aspects, the present invention involves an electrolyte formed of a raw paste material of fruit of the *Carica papaya*.

In another aspect, the present invention is of an electrolytic device having at least two electrodes with an electrolyte formed of paste material of fruit of the *Carica papaya*. This device may have one of its electrodes provided with a layer of electrical insulation thereby constituting an electrolytic capacitor.

In a further aspect, the present invention is a battery having two electrodes spaced from one another with an electrolyte composed essentially of a paste material of fruit of the *Carica papaya*. The electrolyte may also contain an amount of gel forming material.

In a variant, the battery of the present invention is a dry battery. The dry battery has, as is conventional, a negative electrode and a positive electrode. A filler material containing a depolarizing agent is positioned adjacent the cathode. A permeable web separates the filler from the electrolyte, which is in contact with the anode. The electrolyte is composed essentially of a paste material of fruit of the *Carica papaya* and preferably also contains an amount of gel forming material. The filler may contain urine or paste material of fruit of the *Carica papaya* or both of these materials.

The electrolyte according to the present invention is comprised of raw paste material of vegetal origin, in particular of raw paste of fruit of the *Carica papaya*. By the term "raw material of vegetal origin" used throughout this description, raw pulp of fruits of plants and pulp of tree stalks is meant. If desired, such paste material may contain compounded therein, natural or synthetic neutral agents, such as yucca starch, corn starch, wheat meal, α-cellulose, and the like as gel-formers. Particularly suitable for forming the electrolyte is the paste obtained from the fruit of any kind of the varieties of the *Carica papaya*. This fruit is commonly known as the papaya. The dry battery embodying the electrolyte of papaya squash shows a steady tension drop rate, rather than the jerking-wise drop from one tension level to another lower one, as in the case with the prior art batteries.

DETAILED DESCRIPTION OF EMBODIMENTS

Figure 1:
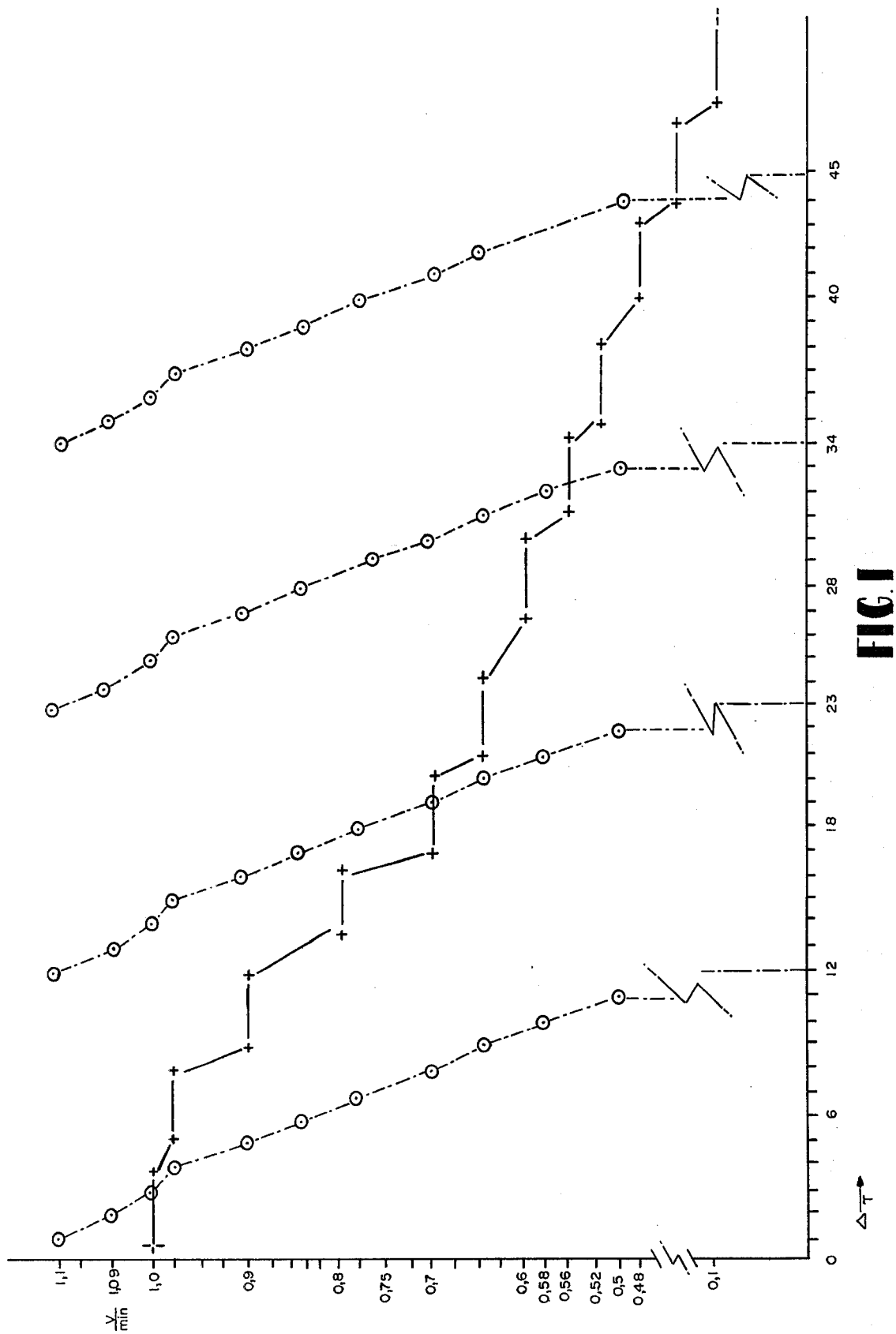
FIG. 1 is a graph showing the effectiveness of an illustrative embodiment of the present invention.

The fruit paste of papaya or other fruit may be formed by liquefying the fruit and thoroughly mixing therewith the starch. The mixture is heated to about 80° C. with continuous stirring. When the paste has dried to some extent, adjuvants may be added. For example, wheat meal may be added as drying agent thereto and heated to keep the mixture boiling at 100° C. until a thick and sticky gel is formed which may suitably be adhered to the battery shell.

The pulp of fruits is comprised of a number of organic compounds, varying as to amount and class, depending on the subject fruit. Among such organic compounds there are organic acids, carbohydrates and proteins comprised of high-weight molecules. Without attempting to limit the invention to any particular explicative theory, it may be postulated that such high-weight molecules, probably on hydrolysis occurring in the electrolytic process performed in the dry battery, undergo structural changes of not well known nature, but that as a result they split into lower molecules which are capable of chelation with the metallic ions afforded to the system by the zinc metal, the manganese dioxide and those metals in trace amounts found as impurities in the cell container.

It is known that the metal chelated forms are apparently more soluble than the salts of their own metals and that, therefore, they will form a bridge of continuous solubilization, thus permanently acting as depolarizers for the dry battery comprising raw paste of fruits of plants. The mechanism of the process performed is not well known at the present, but its actual improved effectiveness is brought out by means of the following illustrative, non-limitative Example.

EXAMPLE

To 7.60 g. of paste formed from the fruit of the papaw tree there is added as gel-formers 0.95 g. of yucca starch and 1.45 g. of wheat meal, with thorough mixing. The so-prepared mixture was gently heated at about 80° C. for 25 minutes using a water bath. About 10 g. of the above mixture were coated on the inner side wall of a zinc container weighing 18 g. A graphite rod weighing 4 g. was located at the center of the container provided on its bottom with an insulating cardboard disk. The rod was encircled by 34.4 g. of depolarizing mixture and this was wrapped with a thin web of newsprint. The above filler and depolarizing mixture was taken from the mix comprised of: Acetylene black 17.8 g.; $MnO_2$ 8.9 g.; ammonium chloride 6.6 g; zinc chloride 1.1 g.

The so prepared battery weighs about 66.4 g. and then was sealed as is customary. The electrical characteristics of the above dry battery were: 1.6 volts, 3.5 amperes.

A test was devised for comparing the performance of the dry battery of this invention against the prior art batteries. Commercial Size D dry batteries and dry batteries prepared as described in the above Example, having the same weight, were used. One commercial battery was applied to drive a first toy electrical locomotive. At the same time one battery according to the invention was used to drive a second toy electrical locomotive of the same weight as the first one. In both instances, the tracks were closed trackways having the same length and shape, arranged at the same horizontal plane. When some time lapsed the first locomotive stopped as its associated battery becomes weak enough. In contraposition, our battery continued driving.

The number of turns each locomotive runs on its track in a five-minute length ($\Delta T_5$ increment) was counted. The number of turns divided by 5 is taken as the average speed in the indicated length of time (V/min). The results are set forth in the following Table II and are plotted in the graph appearing in the drawing.

TABLE II

| $\Delta T_5$ | Turns dry batteries (commercial) | V/m | Turns dry batteries (invention) | V/m |
|---|---|---|---|---|
| $\Delta 1$ | 5.5 | 1.1 | 5.0 | 1 |
| $\Delta 2$ | 5.2 | 1.04 | 5.0 | 1 |

TABLE II-continued

| $\Delta T_5$ | Turns dry batteries (commercial) | V/m | Turns dry batteries (invention) | V/m |
|---|---|---|---|---|
| Δ3 | 5.0 | 1.0 | 5.0 | 1 |
| Δ4 | 4.9 | 0.98 | 5.0 | 1 |
| Δ5 | 4.5 | 0.900 | 4.9 | 0.98 |
| Δ6 | 4.2 | 0.84 | 4.9 | 0.98 |
| Δ7 | 3.9 | 0.78 | 4.9 | 0.98 |
| Δ8 | 3.5 | 0.7 | 4.9 | 0.98 |
| Δ9 | 3.2 | 0.64 | 4.5 | 0.9 |
| Δ10 | 2.9 | 0.58 | 4.5 | 0.9 |
| Δ11 | 2.5 | 0.5 | 4.5 | 0.9 |
| Δ12 | 0 | 0 | 4.0 | 0.8 |
| Δ13 | 5.5 | 1.1 | 4.0 | 0.8 |
| Δ14 | 5.0 | 1.04 | 4.0 | 0.8 |
| Δ15 | 5.0 | 1.0 | 4.0 | 0.8 |
| Δ16 | 4.9 | 0.98 | 3.5 | 0.7 |
| Δ17 | 4.5 | 0.9 | 3.5 | 0.7 |
| Δ18 | 4.2 | 0.84 | 3.5 | 0.7 |
| Δ19 | 3.9 | 0.78 | 3.5 | 0.7 |
| Δ20 | 3.5 | 0.7 | 3.2 | 0.64 |
| Δ21 | 3.2 | 0.64 | 3.2 | 0.64 |
| Δ22 | 2.9 | 0.58 | 3.2 | 0.64 |
| Δ23 | 2.5 | 0.5 | 3.2 | 0.64 |
| Δ24 | 0 | 0 | 3.2 | 0.64 |
| Δ25 | 5.5 | 1.1 | 3.0 | 0.6 |
| Δ26 | 5.2 | 1.04 | 3.0 | 0.6 |
| Δ27 | 5.0 | 1.0 | 3.0 | 0.6 |
| Δ28 | 4.9 | 0.98 | 3.0 | 0.6 |
| Δ29 | 4.5 | 0.9 | 2.8 | 0.56 |
| Δ30 | 4.2 | 0.84 | 2.8 | 0.56 |
| Δ31 | 3.9 | 0.78 | 2.8 | 0.56 |
| Δ32 | 3.5 | 0.7 | 2.8 | 0.56 |
| Δ33 | 3.2 | 0.64 | 2.6 | 0.52 |
| Δ34 | 2.9 | 0.58 | 2.6 | 0.52 |
| Δ35 | 2.5 | 0.5 | 2.6 | 0.52 |
| Δ36 | 0 | 0 | 2.6 | 0.52 |
| Δ37 | 5.5 | 1.1 | 2.4 | 0.48 |
| Δ38 | 5.2 | 1.04 | 2.4 | 0.48 |
| Δ39 | 5.0 | 1.0 | 2.4 | 0.48 |
| Δ40 | 4.9 | 0.98 | 2.4 | 0.48 |
| Δ41 | 4.5 | 0.9 | 2.2 | 0.44 |
| Δ42 | 4.2 | 0.84 | 2.2 | 0.44 |
| Δ43 | 3.9 | 0.78 | 2.2 | 0.44 |
| Δ44 | 3.5 | 0.7 | 2.2 | 0.44 |
| Δ45 | 3.2 | 0.64 | 2.0 | 0.4 |
| Δ46 | 2.9 | 0.58 | 2.0 | 0.4 |
| Δ47 | 2.5 | 0.5 | 2.0 | 0.4 |
| Δ48 | 0 | 0 | 2.0 | 0.4 |

From the above Table II it is noted that the average speed of the locomotive on which the commercial battery acts slows down fast, this showing that the voltage markedly lowers until reaching a value at which the electric motor shuts down. During the same time, the battery of the present invention continues driving the locomotive at a substantially uniform speed.

In FIG. 1, on the ordinate axis is represented the velocity expressed in turns per minute and on the abscissa axis is represented the corresponding ΔT time interval. As above-mentioned, the number of turns per time unit is obtained by counting the number of round turns the mobile runs, during the ΔT time 5-minute interval, and by dividing by 5 such number of turns.

Further, as stated hereinabove, the Table II shows that the number of turns run by the locomotive driven by commercial batteries progressively falls off, whereas the number of turns run by the locomotive driven by the battery of applicants' invention was substantially the same over the first four time increments, totalling twenty minutes. At the end of eight time increments the commercial battery was exhausted whereas applicants' battery kept the locomotive at 0.8 turns per minute. Having been connected to another fresh commercial battery, the first locomotive attained again the speed of 5.5 turns per 5-minute time intervals, nevertheless, the locomotive driven by applicants' battery, even already in service 60 minutes, maintained its speed which only slowed down, steadily, from 4 to 3.2 turns per time interval. When continuing the test, it was necessary to connect two new commercial batteries, in order that the locomotive driven by the same may attain the final speed of 0.4 turns per minute which was still maintained by the locomotive moved by means of the battery constructed in accordance with the present invention.

In other words, the net result from the test shows that the present battery had a life which amounts to four times the life of the conventional commercial batteries of the same size.

It should be noted that changing the depolarizing mixture to a composition of carbon black from coal 17.ι g, $MnO_2$ 8.9 g, and 7.7 g of urine does not substantially affect the the outstanding results obtained by the embodiment of the present invention disclosed above.

Among the fruits of plants applicants have found suitable in different degrees to constitute an electrolyte are included pineapple, papaya, citrics and the like. Suitable materials are also tubers, for instance, yucca (*Manihot utilissima*) and tree parts, such as pine bark. For the purposes of the present invention, the papaya is shown to be by far the most suitable fruit.

Applicants have noted that the fruits of the following plants have also shown, to a limited degree, some promise of providing paste material having an electrolyte nature: Mandarin orange (*Citrus madurensis*); orange (*Citrus aurantium*) bergamot (*Citrus bergamia*); grapefruit (*Citrus deevmana*); pineapple (*ananas sativus*); pear (*Pirus communis*); plum (*Prunus domestica*); custard apple (*Anona muricata*); guava (*Psidium guajava*); tamarind (*Tamarindus indica*); Indian mango (*Magnifera indica*); melon (*Cucumis melo*); tomato (*Lycopersicum esculentum*); Cucurbit (*Passiflora specierum*); eggplant (*Solanum melongenea*); lulo (*Datura stramonium*); pumking (*Adenostyles albiferous*); and potato (*Solanum tuberosum*).

The preferred proportions to form a suitable electrolyte paste according to the present invention are as follows, expressed in weight percent:

| Fruit of the *Carica papaya* | 69.3–84.7% |
|---|---|
| Starch | 8.1–9.9% |
| Wheat meal | 12.6–15.4% | and especially fruit of the *Carica papaya* 77%, starch 9% and wheat meal 14%. It should be understood, however, that the important consideration is that the jelly-like mass formed by such substances be compact and adhesive, especially when the substance is to be used in a dry battery according to the present invention. On the other hand, it should be noted that the two gel-forming elements—starch and wheat meal—could be theoretically eliminated altogether and the papaya component could increase to 100%.

In the present battery a depolarizing filler comprising carbon black or acetylene black is used along with the electrolyte comprising the raw paste of vegetal origin, preferably paste of fruit of the *Carica papaya*. As is usually done in the manufacture of dry batteries, zinc chloride and/or manganese chloride may be used. The preferred kind of carbon black is the Sterling V ® manufactured by Cabot Corporation, and sold in Colombia by Cabot Colombiana S.A. This carbon black has a surface area of 30 m²/g, particle size of 108 millimicrons and a volatile content of 1%, fixed carbon 99% and pH of 7.5. The electrical resistivity of this kind of carbon is low, its density is of about 41 kg/m³. These properties altogether improve the shelf life.

The preferred depolarizing mixture proportions are as follows:

|  | Weight percent |
| --- | --- |
| Acetylene black or carbon black | 46.4–56.8 |
| Manganese oxide | 23.3–28.5 |
| Ammonium chloride | 17.5–21.3 |
| Zinc chloride | 2.9–3.3 |
| Water - as little as possible for rendering the mixture wet. |  |

It should be understood, however, that such depolarizing mixtures without the presence of raw paste of vegetal origin are known and do not per se form the present invention. The use of urine as part of a depolarizing mixture does form a preferred feature of the present invention.

As stated above, urine may be a constituent of the depolarizing mixture. The urine may be of either human or animal origin. Non-limiting examples of the composition of human urine can be seen in Greyton, *Basic Human Physiology: Normal Functions and Mechanisms of Disease*, page 280, Table 24-1, W. B. Sanders Company, Philadelphia (1971) and Winton and Baylis, *Human Physiology*, page 250, Table 9.1, 5th Col., Little, Brown and Company, Boston (1962).

In the constructions of applicants battery the carbon electrode may be located at the center thereof encircled by a filler having therein depolarizing agent, which normally is manganese dioxide. Surrounding such filler is the permeable web and surrounding such web and contacting the zinc electrode, there is arranged the electrolyte comprised of the raw paste of fruit of the *Carica papaya* having therein a suitable gel forming material.

The following Table III shows the discharge characteristics of a battery of this invention.

TABLE III

| Final voltage | Time hrs. | Ah | Watts hr. | Wh/Kg |
| --- | --- | --- | --- | --- |
| 1.4 | 0 | 0 | 0 | 0 |
| 1.2 | 0.25 | 0.061 | 0.079 | 0.827 |
| 1.0 | 2.35 | 0.170 | 0.198 | 1.207 |
| 0.9 | 3.50 | 0.238 | 0.260 | 2.717 |
| 0.8 | 5.50 | 0.342 | 0.342 | 3.582 |

Figure 2:
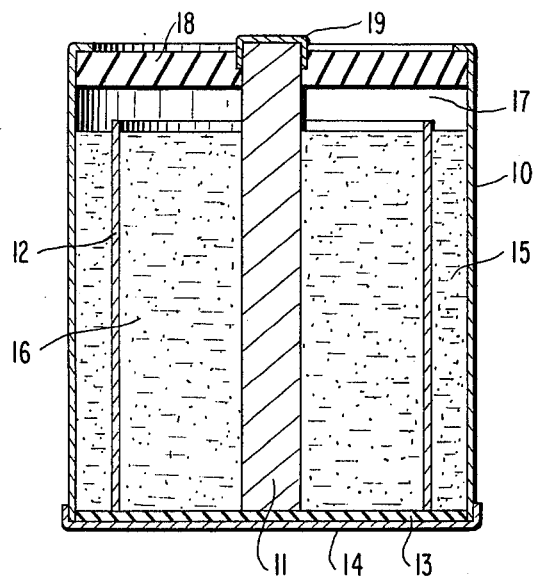
FIG. 2 is an elevational, cross-sectional view of a dry battery according to a first embodiment of the present invention.

As shown in FIG. 2, an exemplary dry cell construction according to the present invention includes a cylindrical tubular negative (anode) electrode 10 of zinc which is positioned coaxially with a solid cylindrical, positive (cathode) electrode 11 of graphite. A permeable web 12, which may be made of newsprint or the like, is positioned between the negative electrode 10 and the positive electrode 10, it being positioned more closely to the negative electrode 10. An electrical insulating disk 13 or the like is positioned beneath the electrodes 10 and 11. A star bottom washer 14 is fixed to the electrode 11 in contact with the disc 13.

An external electrolyte 15, which comprises essentially a raw paste material of fruit of the *Carica papaya*, is provided between the negative electrode 10 and the web 12. The electrolyte 15 desirably contains a gel forming amount of suitable gel forming material to make it compact and adhesive. The gel forming material may be starch and wheat meal, as stated above. In weight percentages, the starch is desirably present in the range of from 8.1% to 9.9%, the wheat meal is present in the range of from 12.6% to 15.4%, and the fruit of the *Carica papaya* is present in the range of from 69.3% to 84.7%. A particularly effective battery is obtained by providing that the fruit of the papaw tree constitutes 77%, the starch constitutes 9% and the wheat meal constitutes 4% of the electrolyte by weight.

A depolarizing mixture 16 is provided between the web 12 and the positive electrode 11. This polarizing mixture 16 may be of a conventional nature or, according to the preferred feature of the present invention, be composed of a novel mixture. Thus, the depolarizing mixture 16 may be conventionally constituted by a mixture of weight proportions as follows: acetylene black or carbon black from 46.2% to 56.8%, manganese dioxide from 23.3% to 28.5%, ammonium chloride from 17.5% to 21.3%, zinc chloride from 2.9% to 3.3% and sufficient water to render the mixture wet.

As a replacement for the ammonium chloride and zinc chloride, the depolarizing mixture 16 may also include, as a further constituent, urine or raw paste of the fruit of the *Carica papaya* or both of these materials. The urine effects a reduction in the internal resistivity of the depolarizing mixture. Both the urine and the paste of fruit of the *Carica papaya* augment the current and result in good voltage regulation.

It is also contemplated, as a preferred feature of the present invention that the depolarizing mixture 16 have proportions which are as follows:

|  | Weight percent | |
| --- | --- | --- |
|  | A | B |
| Acetylene or carbon black | 51.6 | 44.4 |
| Urine | 10.0 | 33.3 |
| Paste of fruit of *Carica papaya* | 12.5 | — |
| MnO₂ | 25.9 | 22.2 |

A gas-storing, expansion space 17 is provided between a conventional pitch seat 18 which extends between the graphite, positive electrode 11 and the zinc, negative electrode 10, as is conventional in dry battery construction. The battery can be provided with a steel jacket and bottom, if desired, or some other housing of conventional construction, the insulating disc 13 serving, in this case, to insulate the positive electrode 11 from the steel bottom. The star bottom washer 14 need not be present in this alternative variant. The top of the positive electrode 11 is provided with a brass cap 19 to facilitate making electrical connections. The electrode 10 of zinc serves both as a container and as the cathode connection of the battery.

The fruit of the *Carica papaya* (papaya), in all its varieties and species, and particularly the fruit of the tree *Carica papaya* is greatly superior to other fruits and organic elements in its function as organic electrolyte and is therefor capable of supporting calories without energy loss in its action as generator of electrons upon contact with the metallic negative electrode of a battery.

These superior characteristics are presumably due to the greater concentration of pectins, papains and pepsins in the papaya fruit.

Organic substances generally include acids, alcohols, aldehydes and esters. Upon contact with with the zinc electrode, organic substances absorb the ions of the electrode. In the case of papaya, the absorption is greater due to the chemical distribution of the electrons in the molecules.

Papaya, due to its greater pectin, papain and pepsin capacity, displays several characteristics which also contribute to its superiority as organic electrolyte:

(a) it easily liberates the zinc electrons for circulation of current and throws off ions towards the cathode for their reduction by oxygen.

(b) It may be manipulated with regard to pressure, molecular reduction and calories.

(c) Its storage produces decomposition which forms additional pectins, papains, and pepsins capable of producing more current, discarding the nonconductive elements that, in their initial form, were not perceived as resistant.

Comparative experiments were carried out by or under the control of the undersigned to demonstrate the relative effectiveness of papaya as compared with other fruits and organic substances in their capacity as electrolyte. The organic substance was used as an electrolyte between a zinc (−) and a graphite (+) electrode and the voltage and amperage were measured. The results are shown in table IV hereinbelow:

TABLE IV

| Organic Substance | Amps | Volts |
|---|---|---|
| Lime | 15 mA | 0.6 Volt |
| Orange | 10 mA | 0.55 Volt |
| Sapota | 13 mA | 0.6 Volt |
| Guava | 18 mA | 0.7 Volt |
| Coconut | 15 mA | 0.7 Volt |
| Chili pepper | 12 mA | 0.7 Volt |
| Tomato | 10 mA | 0.7 Volt |
| Plantain | 11 mA | 0.5 Volt |
| Granadilla | 16 mA | 0.5 Volt |
| Papaya | 130 mA | 1.36 Volt |
| Pineapple | 25 mA | 0.7 Volt |
| Beet | 25 mA | 0.7 Volt |
| Blackberry | 5 mA | 0.8 Volt |
| Carrot | 25 mA | 0.8 Volt |
| Apple | 12 mA | 0.7 Volt |
| Potato | 10 mA | 0.8 Volt |
| Grape | 15 mA | 0.55 Volt |

Papaya is clearly superior in voltage and amperage.

U.S. Pat. No. 1,201,481 to McGall et al suggests the use of organic materials in an electrolyte such as "tapioca, wheat and other grains, gelatin, glue, gums, syrupy extracts, fruit extracts, potato and similar starch cells, starch, casein, etc." as gel-forming agents. The use of papaya as the fruit extract is not suggested for any purpose.

It can be seen from Table 1 that the amperage and voltage received from papaya is significantly greater than that from other fruit extracts and that from potato.

British Pat. No. 641,427 to N. V. Philips' Gloeilampenfabrieken suggests the use of vegetal material in an electrolyte, such as leaves of trees, leaves of cabbages, discs or slices of vegetable material such as apples or other fruit, or the thicker part of stems or roots, for example, of swede turnips, beets, potatoes, and of other vegetables.

Again it can be seen from the above table, that papaya is greatly and unexpectedly superior to apples and other fruit as well as beets and potatoes.

Within a standard battery recipient made of zinc, and using graphite as cathode, a reading of 1.4 Volts and 200 mAmps, the voltage being constant, another clearly superior result, was obtained.

Comparing the papaya cell to the conventional electrolyte of a dry cell, the data appearing in Table V hereinbelow was obtained:

TABLE V

| Conventional Cell | | Papaya Cell | |
|---|---|---|---|
| Electrolyte: (Zinc chloride ammonium chloride) | 1.21 Volts 45 mAmps | Electrolyte: (Carica papaya | 1.35 Volts 130 mAmps |
| Depolarizer: | 0.5 Volts 230 mAmps | Depolarizer: | 0.9 Volts 240 mAmps |
| Total Cell: | 1.5 Volts 3.0 Amps | Total Cell: | 1.7 Volts 4.0–10.0 Amps |

The following may be regarded as the chemical formulations of the various cells which may serve to explain the greater capacity for electrical storage of papaya:

(a) Standard inorganic cell:

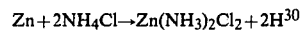

$$Zn + 2NH_4Cl \rightarrow Zn(NH_3)_2Cl_2 + 2H^{30}$$

(b) 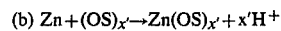

$$Zn + (OS)_{x'} \rightarrow Zn(OS)_{x'} + x'H^+$$

where OS is organic substance other than papaya and $x'$ is greater than 2

(c) 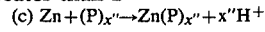

$$Zn + (P)_{x''} \rightarrow Zn(P)_{x''} + x''H^+$$

Where P = papaya, and $x''$ is much greater than $x'$.

In short, the equation (c) is far greater than (b) from the electrochemical point of view as to voltage and amperage.

Figure 3:
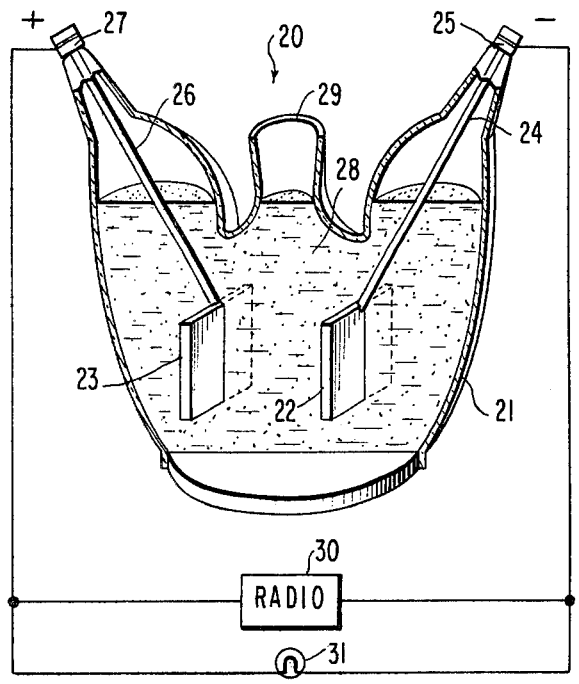
FIG. 3 is a schematic diagram of a circuit in which a battery according to another embodiment of the present invention is shown pictorially, its casing being of transparent material to show the internal construction thereof and some of its electrolyte having been removed to expose portions of its electrodes and leads.

Turning to FIG. 3, a battery 2a according to a further embodiment of the invention, includes a container 21 made of electrical insulating material, for example, glass. A negative (anode) electrode 22 of magnesium and a positive (cathode) electrode 23 of copper are positioned within the container in spaced apart relationship. The negative electrode 22 is connected, via a lead 24, to a binding post 25, which is fitted to the container 21. In a similar fashion, the positive electrode 23 is connected, via a lead 26, to a binding post 27, which is fitted to the container 21. Each of the leads 24 and 26 is desirably made of the same material as the electrode to which it is connected.

An electrolyte 28 made of raw paste of fruit of the Carica papaya is positioned between the electrodes 22 and 23. The electrolyte 28 is inserted into the container 21 through an opening 29. As illustrated, half of the electrolyte 28, the portion closer to the viewer, has been removed so that portions of the electrodes 22 and 23, with their associated leads 24 and 26, can be seen.

The electrolyte 28 desirably may consist solely of a paste made from fruit of the Carica papaya. The electrolyte 28 may also contain gel forming material. The proportions, by weight, and the constituents of the gel forming materials may be as stated above for the electrolyte 15 (FIG. 2). The papaya possesses starches and with heat forms gelatin of an incomplete nature, the process of gelatinization being capable of completion by adding a gel-forming organic or synthetic element.

A transistor radio 30 and a lamp 31 are shown electrically connected in parallel with one another across the terminals 25 and 27 of the battery 20. A test battery constructed as the battery 20, using solely fruit of the Carica papaya as its electrolyte, was found to be capable of providing 650 milliamperes of current at 1.45 volts. The voltage is substantially constant, the amount of energy which can be delivered being proportioned to the area of the electrodes. Polarization occurs toward electrolyte 23 made of copper, the battery 20 functioning as a primary cell.

Figure 4:
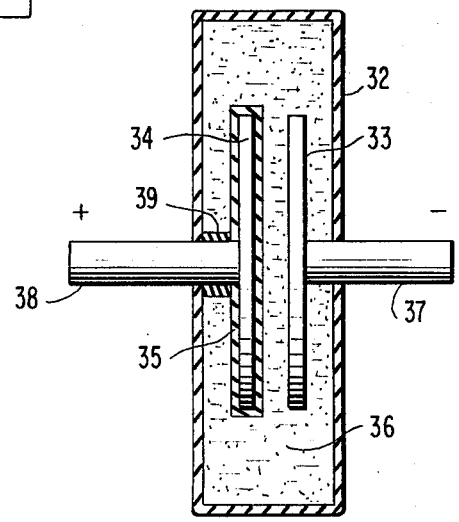
FIG. 4 is a diagrammatic representation of an electrolytic capacitor according to an additional embodiment of the present invention.

As illustrated in FIG. 4, an electrolytic capacitor constructed in accordance with the present invention includes a housing 32 made of insulating material. A pair of closely spaced electrodes 33 and 34 made of aluminum are positioned within the housing 32. The aluminum electrode 34, which is to be connected to a positive potential is provided with a layer 35 of a dielectric material, in this case a layer of aluminum oxide film. An electrolyte 36 is positioned between the electrodes 33 and 34. The electrolyte 36, in accordance with the present invention, is comprised essentially of a raw paste material of fruit of the *Carica papaya*. The electrolyte 36 may also contain gel forming material. The portions by weight and materials may be as stated above for the electrolyte 15 (FIG. 2).

A conductive lead 37 is provided from the aluminum electrode 33 to the outside of the housing 32, this lead being for connection to a negative potential. A conductive lead 38, which is to be connected to a positive potential, is connected to the aluminum electrode 34 and provides a connection therefrom to the outside of the housing 32, an insulator 39 being provided about the lead 38 to avoid contact with the electrolyte 36.

Of course, those skilled in the art may effect changes, without departing from the spirit and scope of the invention, in the preparation, proportion and some other factors involved in the obtainment of the paste of fruit of the *Carica papaya* to be used as the electrolyte of batteries, dry cells, electrolytic capacitors and the like it is to be appreciated that the foregoing examples have been given by way of example, not of limitation. Numerous other embodiments and variants are possible without departing from the invention, its scope being defined by the appended claims.

What is claimed is:

1. An electrolytic device comprising at least two electrodes spaced from one another and an electrolyte positioned between said two electrodes, said electrolyte consisting essentially of paste of material of the fruit of the *Carica papaya*.

2. An electrolytic device in accordance with claim 1 in the nature of an electrolytic capacitor wherein both said electrodes are made of the same material and further including an electrical insulating material between one of said electrodes and said electrolyte.

3. An electrolytic device in accordance with claim 2, wherein said electrodes are of aluminum and said insulating material is aluminum oxide.

4. An electrolytic device in accordance with claim 2, wherein said electrolyte further contains a gel-forming amount of suitable gel forming material.

5. An electrolytic device in accordance with claim 1 in the nature of a battery wherein said electrodes are made of dissimilar materials.

6. An electrolytic device in accordance with claim 5, consisting solely of said two electrodes and said electrolyte.

7. An electrolytic device in accordance with claim 6, wherein one of said electrodes is of copper and the other of said electrodes is of magnesium.

8. An electrolytic device in accordance with claim 6 wherein said electrolyte further contains a gel-forming amount of suitable gel-forming material.

9. An electrolytic device in accordance with claim 5 in the nature of a battery of dry construction, wherein one of said electrodes is a negative electrode and the other of said electrodes is a positive electrode, said electrolyte being in contact with said negative electrode, and further including a permeable web in contact with said electrolyte, and a filler material containing a depolarizing agent between said web and said positive electrode.

10. An electrolytic device in accordance with claim 9, wherein said filler material comprises acetylene-black.

11. An electrolytic device in accordance with claim 9, wherein said positive electrode is of graphite and said negative electrode is of zinc.

12. An electrolytic device in accordance with claim 9 wherein said electrolyte further contains a gel-forming amount of a suitable gel-forming material.

13. An electrolytic device in accordance with claim 12, wherein said gel-forming material comprises starch and wheat meal in proportions such that a jelly-like mass is formed which is compact and adhesive.

14. An electrolytic device in accordance with claim 13, wherein said electrolyte consists essentially of by weight:
   fruit of the *Carica papaya* in the range of from about 69.3% to about 84.7% and as gel-forming agents;
   starch in the range of from about 8.1% to about 9.9% and;
   wheat meal in the range of from about 12.6% to about 15.4%.

15. An electrolytic device in accordance with claim 14, wherein said electrolyte consists essentially of, by weight, about 77% fruit of the *Carica papaya*, and, as gel-forming agents, about 9% yucca starch and about 14% wheat meal.

16. An electrolytic device in accordance with claim 1, wherein said electrolyte consists of 100% fruit of the *Carica papaya*.

17. An electrolytic device in accordance with claim 12 wherein said electrolyte comprises, by weight, at least about 69.3% fruit of the *Carica papaya* and no more than about 30.7% of said gel-forming material.

18. An electrolyte for use in batteries, electrolytic capacitors and the like, comprising, by weight:
   fruit of the *Carica papaya* in the range of from about 69.3% to about 84.7% and
   starch in the range of from about 8.1% to about 9.9%; and
   wheat meal in the range of from about 12.6% to about 15.4% as gel-forming agents.

19. An electrolyte in accordance with claim 18, comprising, by weight, about 77% fruit of the *Carica papaya*, and, as gel forming agents, about 9% yucca starch and about 14% wheat meal.

* * * * *